INVENTOR
HEINRICH HEITZER

BY

ATTORNEYS

July 23, 1968  H. HEITZER  3,393,791
EXCAVATING SYSTEM WITH MOVABLE HOPPER
AND FEEDING CONVEYOR
Filed Feb. 16, 1967  3 Sheets-Sheet 3

INVENTOR
HEINRICH HEITZER

BY
McGlew & Toren
ATTORNEYS

United States Patent Office 3,393,791
Patented July 23, 1968

3,393,791
EXCAVATING SYSTEM WITH MOVABLE HOPPER AND FEEDING CONVEYOR
Heinrich Heitzer, Neuss-Weckhoven, Germany, assignor to Demag-Lauchhammer Maschinenbau und Stahlbau G.m.b.H., Duesseldorf-Benrath, Germany
Filed Feb. 16, 1967, Ser. No. 616,725
Claims priority, application Germany, Feb. 16, 1966, D 49,374
8 Claims. (Cl. 198—36)

ABSTRACT OF THE DISCLOSURE

A hopper car is reversibly driven alongside a receiving conveyor. The hopper car has a transversely movable shunt car upon which the discharge head of a feed conveyor is mounted for swivel movement. The shunt car operates switch means at the extreme ends of its movements so as to reverse the drive to the hopper and thus center the shunt car on the hopper car.

Brief summary of the invention

The invention relates, in general, to an excavation system and, in particular, to a new and useful excavator which includes a hopper car which runs on a track paralleling a delivery conveyor so that the car is always oriented for discharging onto the conveyor and which includes a connecting excavation conveyor which has one end which is pivotally mounted on a movable car arranged to move backwardly and forwardly over the hopper and is connected to excavation apparatus at its opposite end.

In respect to excavators which can work on either stationary or moving conveyor band delivery conveyors, it is expedient to use hopper cars for transfer of the material to the delivery conveyors. However, since the track of the excavator apparatus will generally show a slight deviation from parallel to the conveyor band, it is necessary to equip the loading car with means for supplying the material to the hopper in a manner such that the equipment will not become jammed or the material will not be dumped on a location on the side of the delivery conveyor. This requires that the hopper car must be mounted so that it will take part in the driving movements of the excavation apparatus. It is known to use as an aid contact bars which depend from the loading arm of the excavator and which transmit a switching impulse to the traveling gear of the hopper car when they come in contact with the car. But such a switching device is very bulky due to the lack of a mechanical connection between the arm and the hopper car and in view of the possible deviations of their mutual positions in operation. In addition, the contacting of the switching device is not always certain and reliable and this increases the risk of accidents because of the exposed live parts. In an excavator having a caterpillar chassis, an aggravating factor is that the non-parallel arrangement of the tracks of the excavator and the band road or delivery conveyor makes it difficult to operate these devices together. Deviation from the parallelism of both tracks results in squeezing of parts of the intermediate conveyor which must change its angle frequently in respect to the delivery conveyor in order to maintain the geometric relations of the excavating apparatus.

In accordance with the present invention, the hopper car is mounted on tracks so that it may move along the delivery conveyor and have its delivery outlet oriented always to deliver material directly onto the conveyor. It carries a swivel head plate which mounts the inner end of an excavation or intermediate conveyor which extends outwardly from the hopper to the excavating apparatus. The swivel head plate is carried on a shunt car which moves transversely to the path of movement of the hopper and the delivery conveyor. The swivel head has a delivery opening directly over the hopper so that the material from the intermediate conveyor may deliver the material being excavated by the excavating apparatus directly into the hopper and thence onto the delivery conveyor. Limit switches are arranged on the hopper car so that it will be driven along its track parallel to the delivery conveyor when the shunting car is moved in a manner to operate an actuating switch. The arrangement is such that there is an automatic adjustment by limit switches of the position of the hopper car so that it will follow the advancing mining apparatus without causing any stressing or squeezing of the parts. The swivel head consists of a rotary plate which is provided with an opening for the material to be conveyed which advantageously includes a funnel-like chute for delivering the material downwardly into the hopper. In accordance with a feature of the invention, the swivel head is supported on three rollers which are advantageously spaced evenly, that is, 120° apart to provide a uniformly balanced pivotal support on the shunt car. The three wheel supports provide a stable base for the end of the intermediate conveyor belt which bears on the shunt car which is carried on the hopper car.

In a further development of the invention, the driving gear for the hopper car is equipped with a cut-off retarding device which can be set so that the shunting car is driven until it is returned into a central position after its travel to the end position. In this way, it is less likely that the driving mechanism for the hopper car will be repeatedly actuated.

In a still further modification, the swivel head mounting the intermediate conveyor is provided with switching rulers or actuating elements which are arranged relative to a reversing switch in a manner such that the direct direction of the required movement of the hopper car will be automatically determined and imparted to the car driving mechanism.

Accordingly, is is an object of the invention to provide an excavation apparatus which includes a hopper car which is arranged to discharge over a delivery conveyor and move along a trackway parallel to the conveyor so that its discharge is always aligned therewith and wherein an intermediate conveyor is connected at one end to an excavation apparatus and mounted at its opposite end on a shunt car for pivotal movement and wherein the shunt car is movable transversely to the hopper.

A further object of the invention is to provide an excavation apparatus which includes a movable hopper car which is driven in a manner such that it will provide a pivotal support for the inner end of a conveyor which extends outwardly to an excavation apparatus regardless of the position of the excavation apparatus.

A further object of the invention is to provide an excavation apparatus which includes a hopper car for delivering material onto a delivery conveyor and which is movable parallel to the conveyor and wherein the hopper car provides a pivotal support for the inner end of a conveyor of an excavation apparatus with means associated with the conveyor apparatus on the hopper for continuously shifting the position of the hopper car in order that the hopper will be properly aligned in respect to the conveying apparatus during the shifting of the conveying apparatus in respect to the excavating apparatus.

A further object of the invention is to provide an excavation apparatus which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

*Detailed description*

Figure 1:
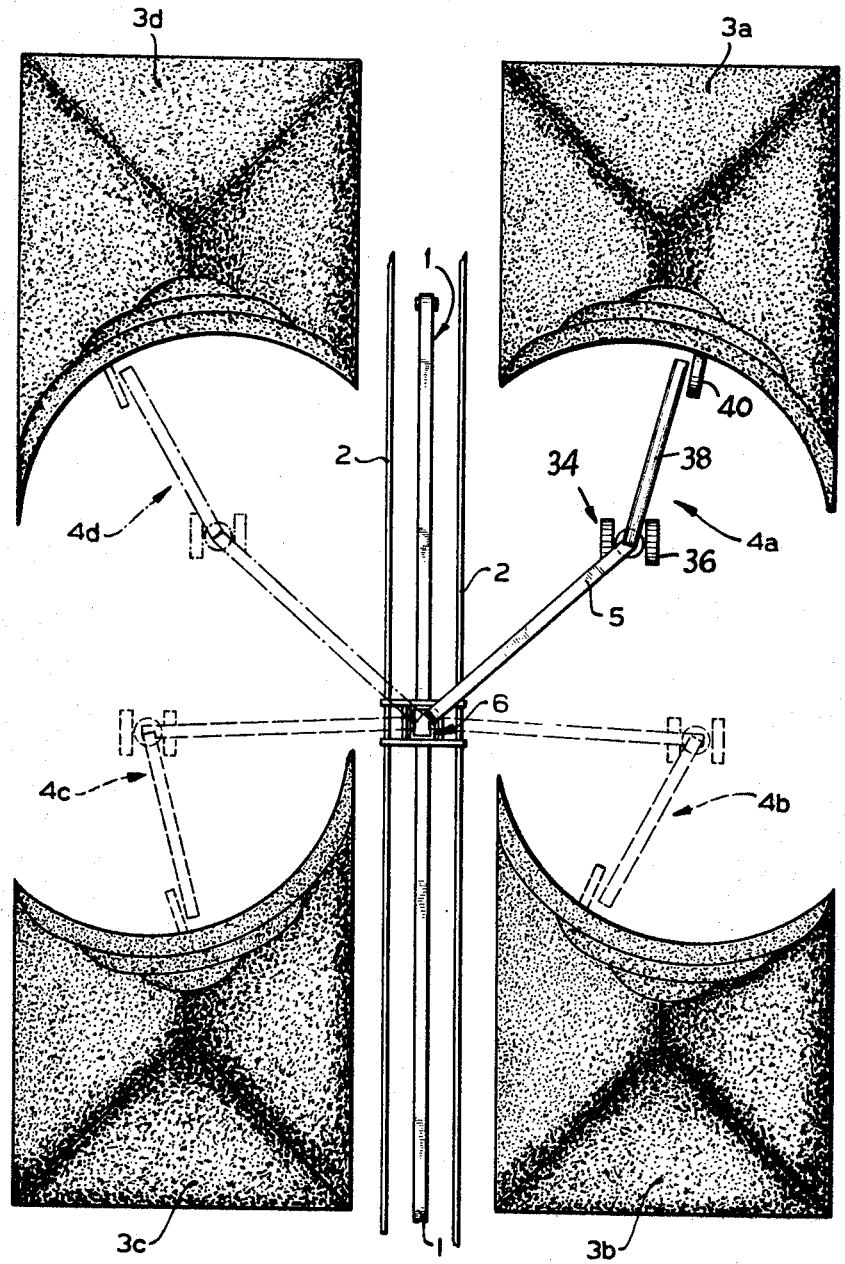
FIG. 1 is a schematic top plan view of an excavation apparatus constructed in accordance with the invention.

Referring to the drawings, in particular, the invention embodied therein comprises as indicated in FIG. 1, an excavation apparatus which includes a delivery conveyor or band road generally designated 1 which is centrally located in respect to a trackway or rails 2.

Figure 2:
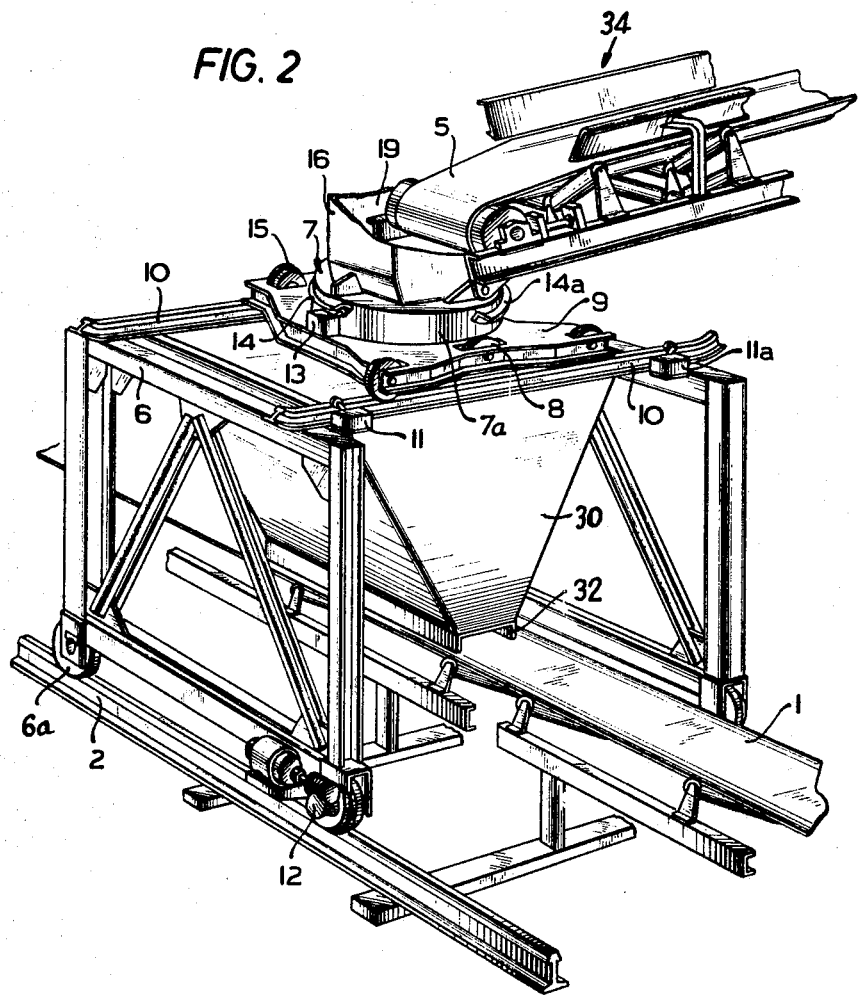
FIG. 2 is a front top perspective view of the hopper car and mounting for the inner end of the intermediate conveyor for the excavating apparatus.

In accordance with the invention, a hopper car generally designated 6 is provided with wheels 6a which permit the car to be moved along the trackway 2 in a manner such that a discharge opening 30 of a hopper 32 thereon is always aligned over the delivery conveyor 1 (FIG. 2).

Associated with the hopper car 6 is excavation apparatus generally designated 34 which includes an intermediate conveyor or excavation conveyor 5, a positioning and supporting apparatus 36, an end conveyor 38 and an excavation device 40. The excavation device 40 picks up material from the dump 3a and delivers to the conveyor 38, the intermediate conveyor 5 and into the hopper 36 carried on the hopper car 6, as shown in FIG. 1. The excavation apparatus 30 may be oriented in the position shown in solid lines at 4a for working at the excavation area or dump 3a or it may be positioned in any one of the dotted line positions indicated in 4b, 4c, 4d or any intermediate positions therebetween. The shifting of the excavation apparatus 30 will, in accordance with the feature of the invention, cause a corresponding movement of the hopper car 6 which is required in order that the intermediate conveyor 5 does not become stressed or squeezed between the end conveyor 38 and the hopper car 6.

As best seen in FIG. 2, the intermediate conveyor belt 5 is mounted at its outer end on the support 32 which advantageously provides for universal pivotal movement thereon. On its inner end the intermediate conveyor 5 is mounted on a swivel head generally designated 7 which includes a cylindrical edge 7a and an interior funnel-shaped chute 16 which receives the material discharged by the intermediate conveyor and delivers it downwardly through an opening 19 into the hopper 36 which permits discharge of the material continuously through the opening 6b onto the conveyor 1.

The swivel head 7 is mounted on three equally spaced (120° apart) rollers 8 which are carried on a shunt car generally designated 9. The shunt car 9 carries three rollers 15 which engage rails 10, 10 in a symmetrical manner. The rails 10, 10 are arranged at respective edges of the hopper 36 to permit transverse movement of the shunt car 9 in respect to the hopper car 6. The shunt car 9 will adjust itself automatically corresponding to the geometrical conditions of the intermediate conveyor 5 and the end conveyor 38 and the excavation apparatus 40. In order to insure that the shunting car 9 does not travel too far to either side, the rails 10, 10 are provided with limit switches 11 and 11a at respective sides, which are actuated by the shunting car in the respective end positions to start the movement of the driving mechanism 12 for moving the hopper car in a respective direction. The driving mechanism 12 is started through a connection (not shown) from the limit switches 11 and 11a and driving will proceed for a certain period beyond the release of the actuated switch to reposition the shunt car 9 at a location out of contact with the switch. The apparatus includes a slow releasing relay connected between the switches 11, 11a and the driving gear 12 but which is not shown in the drawings. The slow releasing relay is necessary in order to insure that the shunt car 9 is returned substantially to its central position before the driving of the hopper car is terminated. Thus, it can be seen that the driving mechanism for the hopper car is started only when a certain distance range of movement of the excavation apparatus 34 has been carried out. This driving movement is only necessary to center the shunt car 9 in respect to the hopper so that further movement of this car may be carried out in the event of a further shifting of the excavation apparatus until the end position is reached and a switch actuated.

In the layout indicated in FIG. 1, it can be seen that it is frequently necessary to take amounts of material from the load alternately from the deposit or dump 3a and 3b or 3b and 3c which are arranged at respective opposite sides of the delivery conveyor 1. In some instances, the areas on the same side of the band are operated together but must be mined in a reverse direction so that alternate mining from dumps 3a and 3b or 3c and 3d are carried out. In these situations, however, the switch settings 11 and 11a actuated by motion of the shunting car 9 and the hopper car 6 do not change. In order to obtain the correct correlation of the hopper car 6 it is necessary to reverse the driving direction of the driving means 12. For this purpose a reversing switch 13 is arranged on the shunting car 9 and it is actuated by an inclined portion of one of two peripherally extending members or rulers 14 and 14a which are carried on the circular plate 7a of the swivel head 7. As soon as a reversing switch 13 is actuated by one of the switching rulers 14 or 14a, the direction of driving movement of the hopper 6 by the driving gear 12 is reversed.

Figure 3:
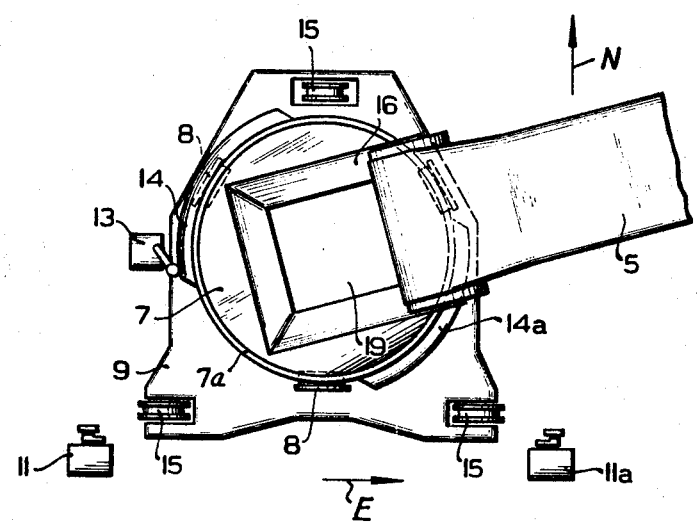
FIG. 3 is a top plan view of the shunt car corresponding to the position of 4a of FIG. 1.
Figure 4:
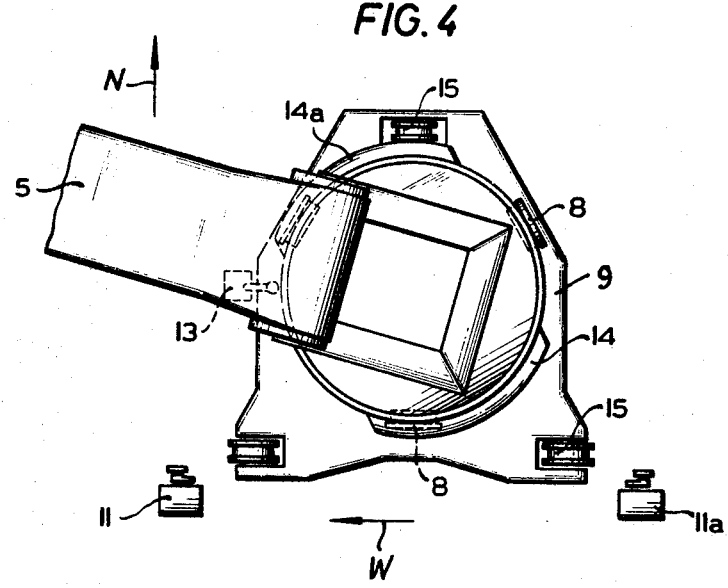
FIG. 4 is a top plan view of the shunt car corresponding to the position of 4d of FIG. 1.

In FIGS. 3 and 4, the conditions of the swivel head 7 and the conveyor chute 5 for the positions corresponding to positions 4a and 4d of FIG. 1 are indicated. Thus, if the excavator moves in a direction of the arrow N as indicated in FIG. 3, the shunting car 9 will move in the direction indicated by the arrow E with the location of the parts indicated in FIG. 3. With the parts in the position indicated in FIG. 4, the movement in the direction N will cause a movement in the direction W of the shunt car 9. Since in the case of FIG. 3, the driving gear 12 must always work in the direction N when the shunt car 9 reaches the limit switch 11a, the movement must be reversed in this case since the hopper car must move in the direction N when the limit switch 11 is released. This reversal is effected by the reversing switch 13 which is actuated by the rulers 14 and 14a, respectively, and which switches a reversing contact (not shown) in the circuit of the drive gear 12.

From the geometric arrangement of the parts, the length of the rulers 14 and 14a may extend over an arc of 90°. It is only for reasons of symmetry that the two rulers are displaced by 180° as indicated. Naturally mechanical reversal is also possible for the actuation of the switch and it is not absolutely essential that switching rulers 14 and 14a be arranged on the shunting car 9 and reversing switch 13 be arranged on the swivel head 7.

While a specific embodiment of the invention has been shown and described in detail to illustrate the application of the inventive principles, it will be understood that the invention may be embodied otherwise without departing from such principles.

What is claimed is:

1. An excavating apparatus comprising a wheeled hopper car having a hopper adapted to be oriented over a delivery conveyor for delivering materials thereto, driving means for driving said hopper car, an excavation apparatus including an excavation conveyor, a shunt car mounted on said hopper car for movement back and forth thereon over said hopper, a swivel head mounting one end of said excavation conveyor on said shunt car for the discharge of material from said excavation conveyor into said hopper, a start switch and a stop switch carried on said hopper car and arranged at spaced locations adjacent the respective opposite ends of the path of movement of said shunt car for actuation by said shunt car, said start and stop switches being connectable to said driving means for actuating said driving means for driving said hopper car in a direction to cause movement of said shunt car in a direction to release whichever of said start and stop switches is actuated.

2. An excavating apparatus according to claim 1, wherein said shunt car is provided with at least three spaced rollers, said swivel head including a cylindrical portion mounted on said rollers for pivotal movement.

3. An excavating apparatus according to claim 1, wherein said shunt car includes a plurality of rollers, said hopper car having a trackway defined across the top thereof, said shunt car having said rollers engaged on said trackway for rolling movement backwardly and forwardly.

4. An excavating apparatus according to claim 1, wherein said driving means includes means for driving said shunt car by a predetermined amount after said start and said stop switches are actuated.

5. An excavating apparatus according to claim 1, including a reversing switch disposed adjacent said swivel and actuated by predetermined movement of said swivel head to reverse said start switch and stop switch to drive said driving means in an opposite direction from their previous setting.

6. An excavating apparatus according to claim 1, including an endless conveyor delivery belt disposed beneath the hopper of said hopper car, a trackway with track portions on each side of said delivery belt over which said hopper car is movable, a shunt car trackway carried on said hopper car and arranged transversely in respect to said delivery conveyor, said means for pivotally supporting said swivel head including roller means carried on said shunt car.

7. An excavating apparatus according to claim 6, including a supporting member connected to the outer end of said conveyor, an excavation conveyor connected from the supporting member outwardly and having an excavation device at its outer end, said excavation conveyor being universally pivotally mounted on said supporting device.

8. An excavating apparatus according to claim 6, wherein said hopper has an enlarged opened top and a narrow bottom discharge opening aligned over said delivery conveyor, said roller means comprising three equally spaced rollers mounted for rotation about substantially horizontal axes and spherically engaging said swivel head.

References Cited
UNITED STATES PATENTS 3,358,809  12/1967  Sukurs _____ 198—36

EDWARD A. SROKA, *Primary Examiner.*